United States Patent
Kodialam et al.

(10) Patent No.: US 9,160,649 B2
(45) Date of Patent: Oct. 13, 2015

(54) METHOD FOR ROUTING TRAFFIC USING TRAFFIC WEIGHTING FACTORS

(75) Inventors: Muralidharan Sampath Kodialam, Marlboro, NJ (US); Tirunell V. Lakshman, Morganville, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 1189 days.

(21) Appl. No.: 10/951,169

(22) Filed: Sep. 27, 2004

(65) Prior Publication Data

US 2006/0067331 A1  Mar. 30, 2006

(51) Int. Cl.
  *H04L 12/721* (2013.01)
  *H04L 12/751* (2013.01)
  *H04L 12/801* (2013.01)
  *H04L 12/803* (2013.01)

(52) U.S. Cl.
  CPC .......... *H04L 45/12* (2013.01); *H04L 45/02* (2013.01); *H04L 47/10* (2013.01); *H04L 47/125* (2013.01)

(58) Field of Classification Search
  USPC ...................... 370/395.41; 709/241
  See application file for complete search history.

(56) References Cited

U.S. PATENT DOCUMENTS

| | | | | |
|---|---|---|---|---|
| 5,872,930 A * | 2/1999 | Masters et al. | ............... | 709/223 |
| 6,032,190 A * | 2/2000 | Bremer et al. | ............... | 709/238 |
| 6,192,401 B1 * | 2/2001 | Modiri et al. | ................ | 709/220 |
| 6,437,804 B1 * | 8/2002 | Ibe et al. | ................ | 715/736 |
| 6,529,498 B1 * | 3/2003 | Cheng | ............. | 370/351 |
| 6,611,874 B1 * | 8/2003 | Denecheau et al. | ........... | 709/239 |
| 6,646,989 B1 * | 11/2003 | Khotimsky et al. | ........... | 370/238 |
| 7,042,846 B2 * | 5/2006 | Bauer | .............. | 370/238 |
| 2002/0015386 A1 * | 2/2002 | Kajiwara | ....................... | 370/248 |
| 2004/0024906 A1 * | 2/2004 | Valdevit et al. | ............... | 709/241 |
| 2004/0042473 A1 * | 3/2004 | Park et al. | ...................... | 370/408 |
| 2004/0064583 A1 | 4/2004 | Dani et al. | | |
| 2004/0146007 A1 * | 7/2004 | Saadawi et al. | ............... | 370/238 |
| 2004/0219909 A1 * | 11/2004 | Kennedy et al. | ........... | 455/422.1 |
| 2005/0120095 A1 * | 6/2005 | Aman et al. | ................. | 709/219 |
| 2006/0067503 A1 * | 3/2006 | Caugherty et al. | ....... | 379/221.07 |

FOREIGN PATENT DOCUMENTS

| | | |
|---|---|---|
| EP | 1 227 624 A | 7/2002 |
| EP | 05 25 5922 | 11/2005 |
| JP | H06-038257 | 2/1994 |
| JP | H09-284341 | 10/1997 |
| WO | WO 2004/068258 A | 8/2004 |

* cited by examiner

*Primary Examiner* — Hicham Foud
(74) *Attorney, Agent, or Firm* — Wall & Tong, LLP

(57) ABSTRACT

The invention includes a method for routing traffic from a first node towards a plurality of intermediate nodes. A method includes receiving traffic at a first node and routing respective portions of the received traffic toward respective intermediate nodes according to respective traffic weighting factors associated with the intermediate nodes. Upon receiving the respective portions of the traffic, the intermediate nodes may then route the traffic toward one or more destination nodes, or may route the traffic toward another plurality of intermediate nodes before the traffic is routed to a destination node. The intermediate node traffic weighting factors may be dependent on the first node and the destination node, or may be independent of the first node and the destination node.

17 Claims, 6 Drawing Sheets

METHOD FOR ROUTING TRAFFIC USING TRAFFIC WEIGHTING FACTORS

FIELD OF THE INVENTION

The invention relates to the field of communication networks and, more specifically, the routing of traffic through a communication network.

BACKGROUND OF THE INVENTION

In a given communication network, the routing of traffic from a source to a destination can be accomplished by a variety of methods. In the traditional pipe model routing schemes, traffic between network access points is carried through point-to-point pipes having pre-allocated capacities. In one variation of this model, a pipe is allocated for the worst case traffic between each pair of nodes in the network, and the capacities of these pipes are added in order to calculate the required capacity of a link connecting those nodes. In many models, knowledge of the actual traffic in the network (i.e., the traffic matrix) is required in order to route the traffic efficiently.

The traffic matrix is typically difficult to determine, often requiring the use of extensive computing resources. Furthermore, traffic in a network is constantly changing over time, requiring even greater network resources to track and react to the network traffic changes. Ideally, the routing scheme in a network should be changed to accommodate dynamic changes in the traffic matrix. There are often problems with implementing this approach. Unfortunately, it is inherently difficult to change a routing scheme quickly enough to accommodate such dynamic traffic changes.

Since knowing the entire traffic matrix of a network is difficult in practice, there have been alternate approaches to specifying the traffic matrix. One such method that has been recently proposed is the hose model. In the hose model, network traffic is characterized using per-node aggregate ingress and egress traffic volumes instead of using a traffic matrix of point-to-point demands for each pair of nodes in the network. In other words, in the hose model, the ingress and egress capacities are assumed to be known for each of the nodes in a network; however, the exact traffic splits among the nodes are not known. A major criticism of the hose model is that, compared to a network in which the entire traffic demand matrix is known, extensive resources and over-provisioning of capacity are required in order to route traffic.

Tree routing is a variation of the hose model in which a path through a network is computed using a tree approach in which connections through the network are restricted to using a tree subset of the original topology of the network. Since the routing in this case is constrained to the use of a tree, path length can be significantly longer than other variations of the hose model, and additional capacity may be required in order to implement redundancy. Thus, there is no guarantee that the routing algorithm, even an optimal solution to the algorithm, will be bandwidth efficient.

For the case in which the uncertainty of the traffic distribution within a network is high, the flexibility, reduced blocking, decreased traffic loss and ease of specification of the different variations of the hose model make the hose model an attractive alternative to the traditional pipe model of routing. Unfortunately, the over-provisioning currently required to implement the different variations of the hose model, however, is still a major drawback of the hose model, especially since the required over-provisioning factor tends to increase with network size for existing variations of the hose model.

SUMMARY OF THE INVENTION

The invention comprises a method for routing traffic from at least one of a plurality of first nodes towards a plurality of intermediates nodes according to respective intermediate node weighting factors. Specifically, a method according to one embodiment comprises receiving traffic at a plurality of first nodes, identifying a plurality of intermediate nodes intermediate said plurality of first nodes and at least one destination node, determining respective intermediate node traffic weighting factors and routing portions of the traffic towards said plurality of intermediate nodes according to the intermediate node traffic weighting factors.

In one embodiment, the invention comprises a computer readable medium storing a software program that, when executed by a computer, causes the computer to perform a method comprising receiving traffic at a first node, wherein the traffic is adapted for routing towards each of a plurality of intermediate node and the first node associates each of the intermediate nodes with a respective traffic weighting factor, and routing respective portions of the traffic towards each of the plurality of intermediate nodes according to the respective intermediate node traffic weighting factors.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a virtual private network architecture including a plurality of first nodes, a plurality of intermediate nodes, and a plurality of destination nodes. However, the methodology of the invention can readily be applied to other network architectures and topologies. One embodiment of the invention comprises a method of routing network traffic from a first node to a plurality of intermediate nodes according to respective intermediate node traffic weighting factors associated with the plurality of intermediate nodes.

This method eliminates the need for knowledge of the actual traffic in the network (traffic matrix) since only the ingress and egress capacities associated with each of the nodes in the network are required to optimize the routing of traffic through the network. Furthermore, careful selection of the weighting factors results in an improvement of the bandwidth efficiency of the network.

Figure 1:
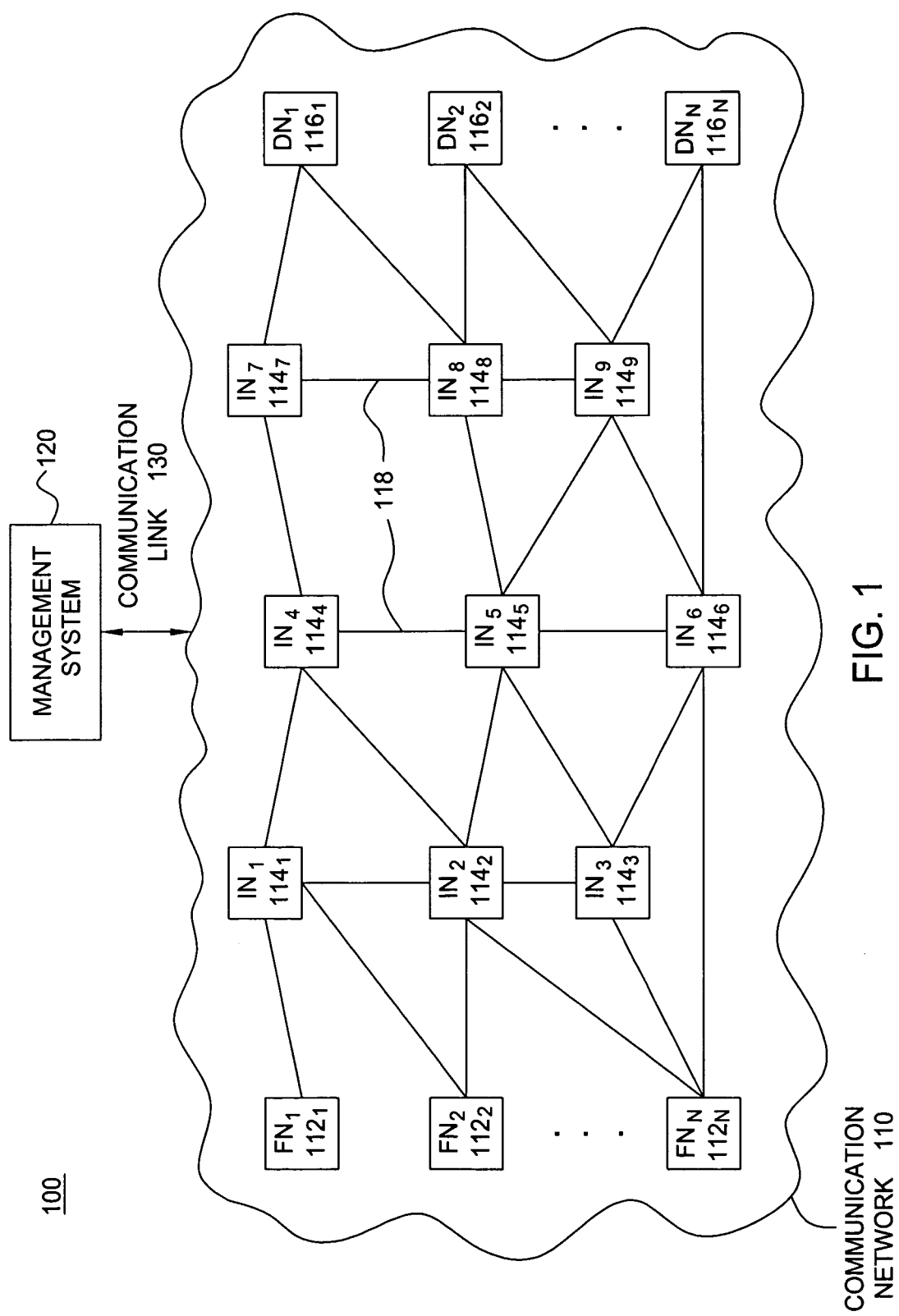
FIG. 1 depicts a high level block diagram of a communication network architecture.

FIG. 1 depicts a high level block diagram of a communication network architecture benefiting from the present invention. Specifically, communication network architecture 100 of FIG. 1 comprises a communication network 110 in communication with a management system 120 via a communication link 130. The communication network 110 comprises a plurality of first nodes $112_1$ through $112_N$ (collectively first nodes 112), a plurality of intermediate nodes $114_1$ through $114_9$ (collectively intermediate nodes 114) and a plurality of destination nodes $116_1$ through $116_N$ (collectively destination nodes 116). For the purposes of clarity by example, nine intermediate nodes are represented in FIG. 1; however, fewer or more intermediate nodes may be used.

As depicted in FIG. 1, the first nodes 112, intermediate nodes 114, and destination nodes 116 communicate via communication links 118. Although not depicted in FIG. 1, each of the first nodes 112 may be directly connected to each other via additional communication links. Similarly, although not depicted in FIG. 1, each of the destination nodes 116 may be directly connected to each other via additional communication links. Furthermore, although not depicted in FIG. 1, each of the first nodes 112 may be directly connected to each of the destination nodes via additional communication links.

Furthermore, although depicted as performing only one role each of the first nodes 112 may operate as an intermediate node and as a destination node in addition to functioning as a first node. Similarly, although depicted as performing only one role each of the intermediate nodes 114 may operate as a first node and as a destination node in addition to functioning as an intermediate node. Similarly, although depicted as performing only one role each of the destination nodes 116 may operate as a first node and an intermediate node in addition to functioning as a destination node.

Given any one of the first nodes 112, each of a corresponding plurality of intermediate nodes 114 has associated with it a respective intermediate node traffic weighting factor, such that the sum of the respective intermediate node traffic weighting factors is one (one hundred percent). Thus, the respective intermediate node traffic weighting factors are set regardless of the first node 112 receiving the traffic. A subset of intermediate nodes 114 associated with a given any one of the first nodes 112 may have respective traffic weighting factors equal to zero.

In one embodiment, the invention comprises a method for routing traffic from one of the first nodes 112 to the intermediate nodes 114, wherein the method comprises receiving traffic at one of the first nodes 112, and routing the traffic towards the intermediate nodes 114 according to respective traffic weighting factors associated with each of the intermediate nodes 114. The routing of network traffic from one of the first nodes 112 to one of the intermediate nodes 114 according to an intermediate node traffic weighting factor is a first stage (phase) of routing network traffic from one of the first nodes 112 to one of the destination nodes 116.

For example, assume that traffic is received at first node $112_2$ and routed from first node $112_2$ towards intermediate nodes $114_4$, $114_5$ and $114_6$, where each of the intermediate nodes $114_4$, $114_5$ and $114_6$ has associated with it a respective traffic weighting factor. For the purposes of this example, assume that the traffic weighting factors associated with intermediate nodes $114_4$, $114_5$ and $114_6$ are 0.3, 0.4 and 0.3, respectively. Thus, according to this example, thirty percent of the traffic received at first node $112_2$ is routed towards intermediate nodes $114_4$, forty percent of the traffic received at first node $112_2$ is routed towards intermediate node $114_5$ and thirty percent of the traffic received at first node $112_2$ is routed towards intermediate node $114_6$.

The routing of the network traffic is accomplished by at least one of a plurality of methods. In one embodiment, the traffic received at one of the first nodes 112 is routed to intermediate nodes 114 randomly such that each of the respective traffic weighting factors are maintained at a constant value. In another embodiment, the network traffic received at one of the first nodes 112 is routed to the intermediate nodes 114 according to a round-robin algorithm such that each of the respective traffic weighting factors are maintained at a constant value.

In one further embodiment of the present method, the network traffic routed from one of the first nodes 112 to the intermediate nodes 114 is routed from the intermediate nodes 114 towards the destination nodes 116. The routing of network traffic from one of the intermediate nodes 114 to one of the destination nodes 116 is a second stage of routing network traffic from one of the first nodes 112 to one of the destination nodes 116. In continuation of the example above, the traffic routed from first node $112_2$ to intermediate nodes $114_4$, $114_5$ and $114_6$ is then routed from each of those intermediate nodes $114_4$, $114_5$ and $114_6$ towards the destination nodes 116.

In one such embodiment, the traffic routed by, illustratively, first node $112_2$ belongs to a single connection that is routed to one of the destination nodes 116. In this embodiment, the traffic received at intermediate nodes $114_4$, $114_5$ and $114_6$ is routed to one of the destination nodes 116 (destination node $116_1$ for example). In another such embodiment, in which the traffic routed by first node $112_2$ belongs to a plurality of connections, the traffic received at intermediate nodes $114_4$, $114_5$ and $114_6$ is routed to at least one of the destination nodes 116.

The destination nodes 116 to which the traffic is routed are determined by the intermediate nodes 114 by examining packet headers of the network traffic being routed. After determining the destination node for which the traffic is intended, the routing of traffic from the intermediate nodes 114 towards destination nodes 116 is accomplished by at least one of a plurality of methods. In one embodiment, the routing of traffic from intermediate nodes 114 to destination nodes 116 is performed using a conventional method of routing traffic within a network, such as least cost path routing algorithms, shortest path routing algorithms and the like.

In another embodiment, the method is performed iteratively by each of a first plurality of intermediate nodes in order to route the traffic to at least one other plurality of intermediate nodes, prior to routing of the traffic towards the destination nodes 116. In this embodiment, each of the first plurality of intermediate nodes receiving traffic from one of the first nodes 112 operates as a first node, as described above, for the at least one other plurality of intermediate nodes to which the traffic is routed prior to being routed towards the destination nodes 116.

Similarly, this embodiment is extendible to support additional pluralities of intermediate nodes between the plurality of first nodes and the plurality of destination nodes. As such, there is no limit to the number of pluralities (stages) of intermediate nodes that may be defined in order to receive, process, and route traffic according to associated traffic weighting factors prior to the routing of the traffic towards the destination nodes 116.

As mentioned above, the routing of traffic from the intermediate nodes 114 to destination nodes 116 is accomplished using at least one of a plurality of methods. In one embodiment, the routing of traffic from intermediate nodes 114 to destination nodes 116 is performed using a conventional method of routing traffic within a network, such as least cost path routing algorithms, shortest path routing algorithms and the like. In another embodiment, the intermediate nodes 114 route traffic towards destination nodes 116 according to at least one other traffic weighting factor associated with at least one of the intermediate node routing the traffic and the destination node for which the traffic is intended.

Consider the example described above, in which a fraction of the traffic received at first node $112_2$ is routed from first node $112_2$ to the intermediate node $114_5$ according to a first intermediate node traffic weighting factor of 0.4. In the present embodiment, this traffic received at intermediate node $114_5$ is then routed towards destination node $116_1$ according using at least one of a conventional method of routing traffic within a network and at least one other traffic weighting factor.

Using the methodologies of the present invention, the total amount of traffic that is routed from $node_i$ to $node_j$ is given by the equation $\Theta_j R_i + \Theta_i C_j$. In this equation, the first term $\Theta_j R_i$ represents the amount of network traffic routed from $node_i$ to $node_j$ that is currently in the first phase of routing from one of the first nodes 112 to one of the intermediate nodes 114, and the second term $\Theta_i C_j$ represents the amount of network traffic routed from $node_i$ to $node_j$ that is currently in the second phase of routing from one of the intermediate nodes 114 to one of destination nodes 116.

In the first term $\Theta_j R_i$, $\Theta_j$ is the intermediate node traffic weighting factor associated with $node_j$, and $R_i$ is the total ingress capacity of $node_i$. In the second term $\Theta_i C_j$, $\Theta_i$ is the intermediate node traffic weighting factor associated with $node_i$, and $C_j$ is the total egress capacity of $node_j$. As described above, the intermediate node traffic weighting factors $\Theta_i$ and $\Theta_j$ represent the fraction of traffic routed to those respective nodes from the first nodes 112. As such, the total amount of traffic between $node_i$ and $node_j$ (and therefore, the total amount of capacity required between $node_i$ and $node_j$) is independent of the traffic matrix of communication network 110.

For example, in order to determine the amount of traffic routed from the intermediate node $114_2$ to the intermediate node $114_8$, network traffic in both the first and second stages of routing between intermediate node $114_2$ and $114_8$ is counted. In this example, assume that network traffic is routed from the first node $112_2$ to the intermediate node $114_8$ through intermediate nodes $114_2$ and $114_5$ according to an intermediate node traffic weighting factor. Since that network traffic is being routed in the first stage (phase) of routing according to the present invention, that network traffic is counted as a portion of the first term $(\Theta_j R_i)$ of the equation defined above.

In continuation of this example, assume that network traffic is routed from the first node $112_1$ to the intermediate node $114_2$ according to an intermediate node traffic weighting factor. Further assume that the network traffic routed to the intermediate node $114_2$ is then routed to the destination node $116_2$ through intermediate nodes $114_5$ and $114_8$. Since that network traffic is being routed from intermediate node $114_2$ to intermediate node $114_8$ in the second stage (phase) of routing according to the present invention, that network traffic is counted as a portion of the second term $(\Theta_i C_j)$ of the equation defined above.

The first intermediate node traffic weighting factors may be established in a manner tending to cause a substantially constant utilization of a path between two nodes in the network 110 (illustratively, between intermediate node $114_2$ and intermediate node $114_8$). The path having a substantially constant utilization has a capacity that is given by the equation $\Theta_j R_i + \Theta_i C_j$, as described above. The establishment of such paths having substantially constant utilization results in routing of traffic that is independent of the traffic matrix of the network.

As such, the present invention provides an efficient utilization of network capacity without requiring knowledge of the traffic matrix of the network.

In one embodiment, intermediate nodes 114 of communication network 110 do not currently have respective traffic weighting factors associated with them. As such, the routing of traffic through the network may be based on any conventional method of routing traffic through a network. In this embodiment, the invention comprises a method for adapting traffic flow within an existing network. As described herein, at least one set of respective traffic weighting factors may be used to control the flow of traffic within a network.

In one embodiment, respective traffic weighting factors are established for each of the intermediate nodes 114. The respective traffic weighting factors are used to adapt the routing of traffic from the first nodes 112 to the intermediate nodes 114. In another embodiment, next respective traffic weighting factors are established for a next plurality of intermediate nodes, wherein the next respective traffic weighting factors operate to adapt the routing of traffic from the first plurality of intermediate nodes to the next plurality of intermediate nodes. Since there is no limit to the number of stages of intermediate nodes between the start nodes 112 and destination nodes 116, there is no limit to the number of respective traffic weighting factors associated with those stages of intermediate nodes.

The establishment of the respective intermediate node traffic weighting factors associated with the intermediate nodes 114 is accomplished by at least one of a plurality of methods. In one embodiment, the respective intermediate node traffic weighting factors are determined by a management system, management system 120 as depicted in FIG. 1 for example. In this embodiment, the respective intermediate node traffic weighting factors are then communicated to the first nodes 112, intermediate nodes 114 and destination nodes 116 for use in routing the traffic. In another embodiment, the respective intermediate node traffic weighting factors are determined by at least one of the first nodes 112, intermediate nodes 114 and destination nodes 116, and are then communicated amongst the nodes within communication network 110. In both embodiments, the respective traffic weighting factors are communicated using any suitable means of communication between network elements.

The adaptation of traffic flow within an existing network via management system 120 is accomplished using at least one of a plurality of methods. In one embodiment, the management system 120 reads a software program, executes the software program and communicates the resulting traffic routing instructions to the nodes in communication network 110. In this embodiment, the resulting traffic routing instructions are used to adapt the traffic flow within the network.

In another embodiment, management system 120 communicates at least a portion of a software program to at least one of the nodes in communication network 110. In this embodiment, a node receiving at least a portion of a software program executes the received portion of the software program such that the resulting traffic routing instructions are used by that node in order to adapt the flow of traffic within the network.

Figure 2:
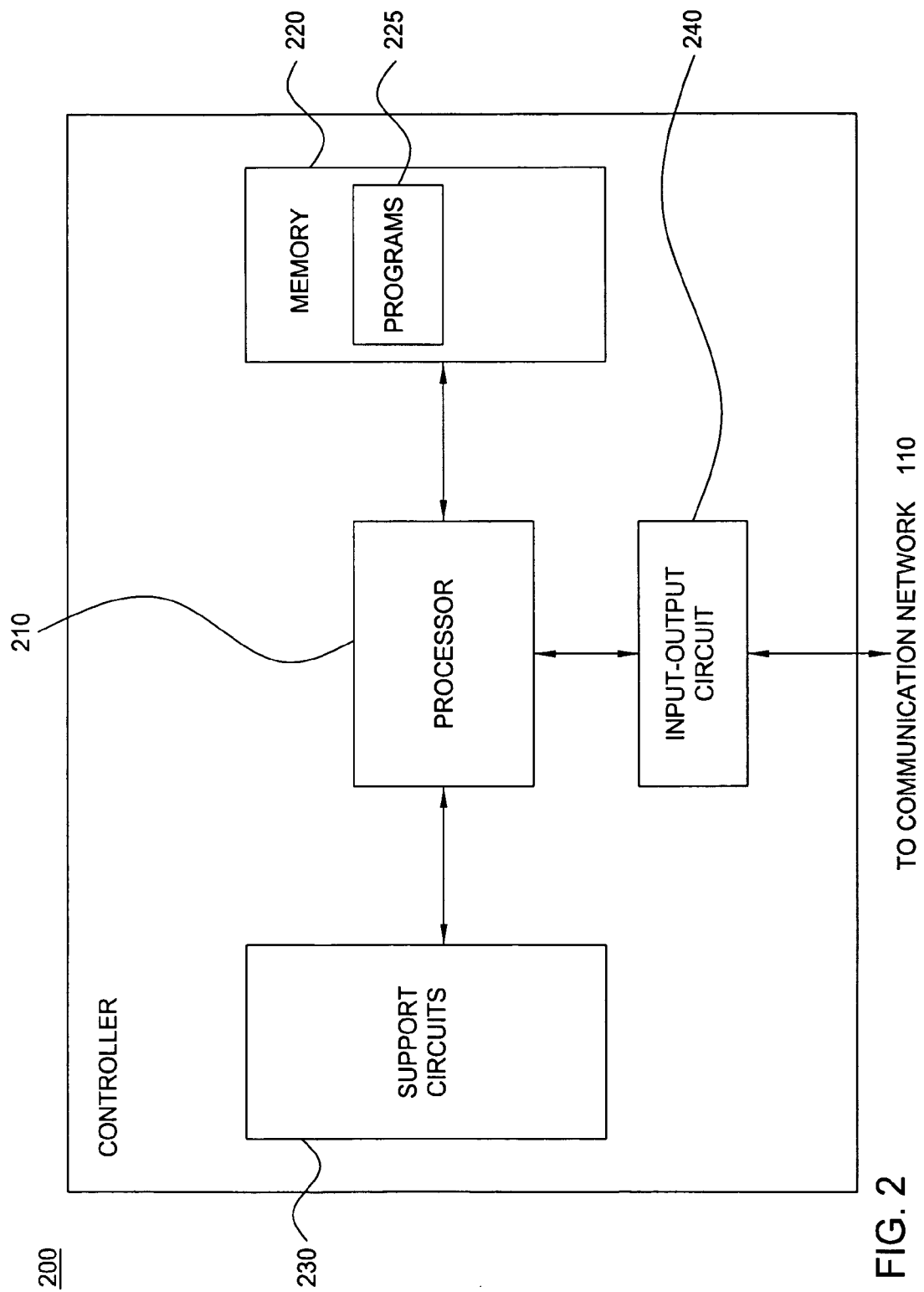
FIG. 2 depicts a high level block diagram of a controller suitable for use in the communications network architecture of FIG. 1.

FIG. 2 depicts a high level block diagram of a controller suitable for use in the communications network architecture 100 of FIG. 1. Specifically, exemplary controller 200 of FIG. 2 comprises a processor 210, a memory 220 for storing various element management, network management, traffic management and control programs 225, support circuits 230 and input-output circuit 240. As depicted in FIG. 2, the memory 220, support circuits 230 and input-output circuit 240 are coupled to the processor 210.

The processor 210 cooperates with conventional support circuits 230, such as power supplies, clock circuits, cache memory and the like, as well as circuits that assist in executing the programs 225 stored in memory 220. As such, it is contemplated that some of the process steps disclosed herein as software processes may be implemented within hardware, for example, as the support circuits 230 that cooperate with the processor 210 to perform various steps.

The controller 200 includes input-output circuit 240 that forms an interface between the various functional elements of controller 200 for communicating with the network 110 of FIG. 1. In one embodiment, the controller 200 of FIG. 2 is implemented as the management system 120 of FIG. 1. In this embodiment, as depicted in FIG. 1, management system 120 communicates with communication network 110 via communication link 130.

Although the controller 200 of FIG. 2 is depicted as a general purpose computer that is programmed to perform various traffic routing functions in accordance with the present invention, the invention can be implemented in hardware as, for example, an application specific integrated circuit. As such, the process steps described herein are intended to be broadly interpreted as being equivalently performed by software and hardware, either singly or in combination.

Figure 3:
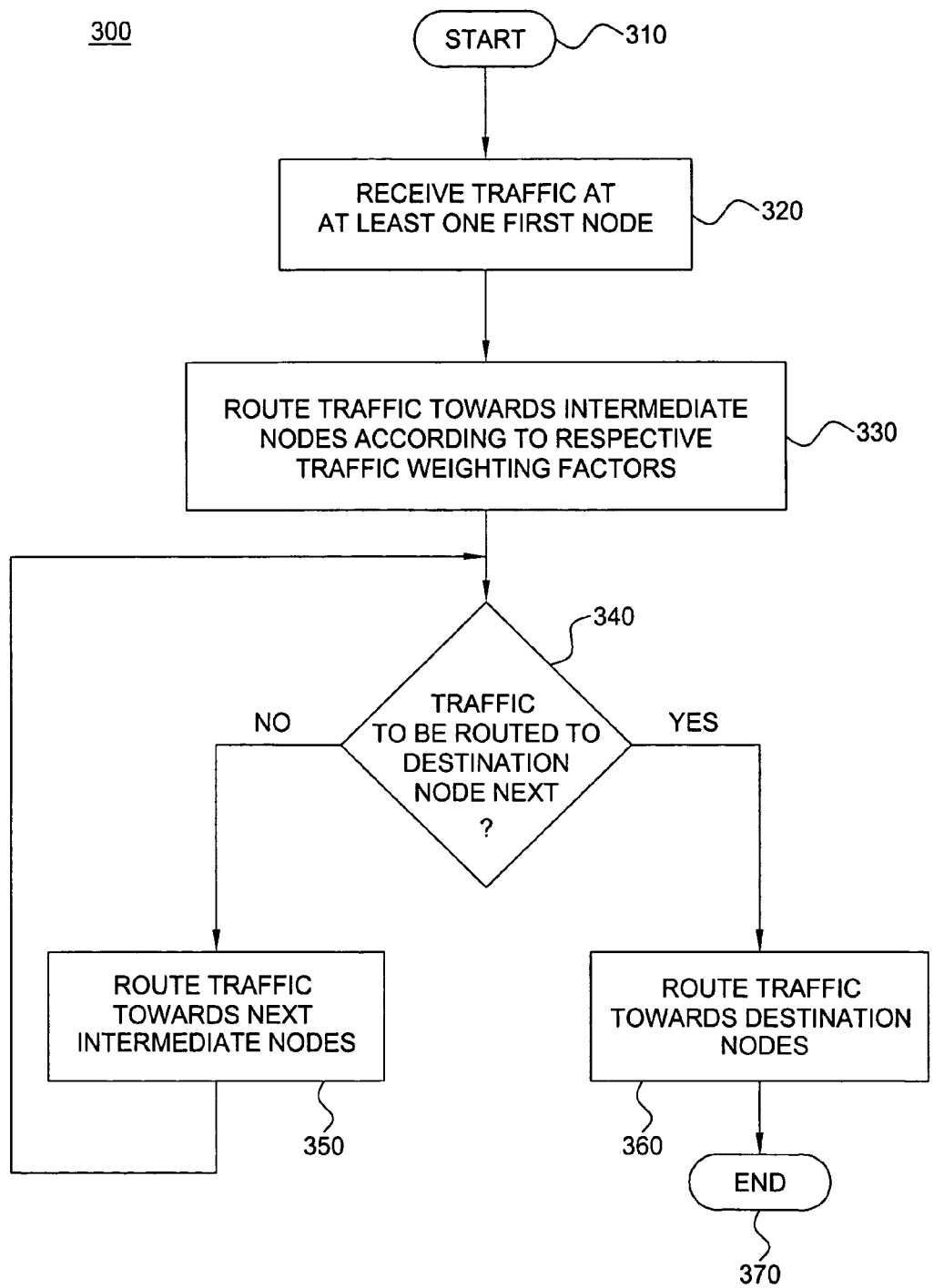
FIG. 3 depicts a flow diagram of a method according to the present invention.

FIG. 3 depicts a flow diagram of a method according to the present invention. Specifically, FIG. 3 depicts a flow diagram of a method 300 for routing network traffic from at least one of a plurality of first nodes to at least one plurality of intermediate nodes according to respective intermediate node traffic weighting factors; and, optionally, to at least one destination node. The method 300 of FIG. 3 is entered at step 310 and proceeds to step 320 where traffic is received by at least one of the plurality of first nodes. The traffic is received and processed according to any suitable method of performing those functions as known in the art.

At step 330, network traffic received by the plurality of first nodes during step 320 is routed to at least one of the plurality of intermediate nodes according to respective intermediate node traffic weighting factors. The intermediate nodes to which the network traffic is routed are not necessarily directly coupled to the first node that is routing the network traffic. In one embodiment, the method 300 optionally ends after step 330. In another embodiment, method 300 proceeds to step 340.

At step 340, intermediate nodes that received traffic at step 330 determine if the traffic should be routed directly to at least one of the plurality of destination nodes, or if the traffic should be routed to a next plurality of intermediate nodes prior to being routed to at least one of the plurality of destination nodes. If the traffic should be routed to a next plurality of intermediate nodes, the method 300 proceeds to step 350. If the traffic should be routed directly to at least one of the plurality of destination nodes, the method 300 proceeds to step 360.

At step 350, the intermediate nodes that last received network traffic route that traffic to the next plurality of intermediate nodes. In one embodiment, routing of network traffic to the next plurality of intermediate nodes is performed using a conventional method of routing traffic within a network, such as least cost path routing algorithms, shortest path routing algorithms and the like. In another embodiment, the routing of traffic to the next plurality of intermediate nodes is performed according to next respective intermediate node traffic weighting factors associated with the next plurality of intermediate nodes.

The steps 340 and 350 are then executed recursively until the traffic is routed to the plurality of intermediate nodes that will route the traffic directly to at least one of the plurality of destination nodes. As traffic is received by the final plurality of intermediate nodes that route the traffic directly to at least one of the plurality of destination nodes, the method 300 proceeds to step 360.

At step 360, the final plurality of intermediate nodes that receive traffic route that traffic towards at least one of the plurality of destination nodes. The destination nodes towards which the traffic is routed are not necessarily directly coupled to the plurality of intermediate nodes from which the traffic is routed. In one embodiment, in order to determine the destination node for which a data packet is intended, the intermediate node routing the data packet extracts and reads the header of the data packet in order to determine the intended destination node.

The routing of traffic from the final plurality of intermediate nodes towards the plurality of destination nodes is accomplished by at least one of a plurality of methods. In one embodiment, the routing of traffic from the final plurality of intermediate nodes towards at least one of the plurality of destination nodes is performed using a conventional method of routing traffic within a network, such as least cost path routing algorithms, shortest path routing algorithms and the like.

In another embodiment, the routing of traffic from the final plurality of intermediate nodes towards at least one of the plurality of destination nodes is performed according to respective traffic weighting factors associated with each of the final plurality of intermediate nodes. After the network traffic has been routed towards at least one of the plurality of destination nodes, the method 300 proceeds to step 370 where method 300 ends.

Figure 4:
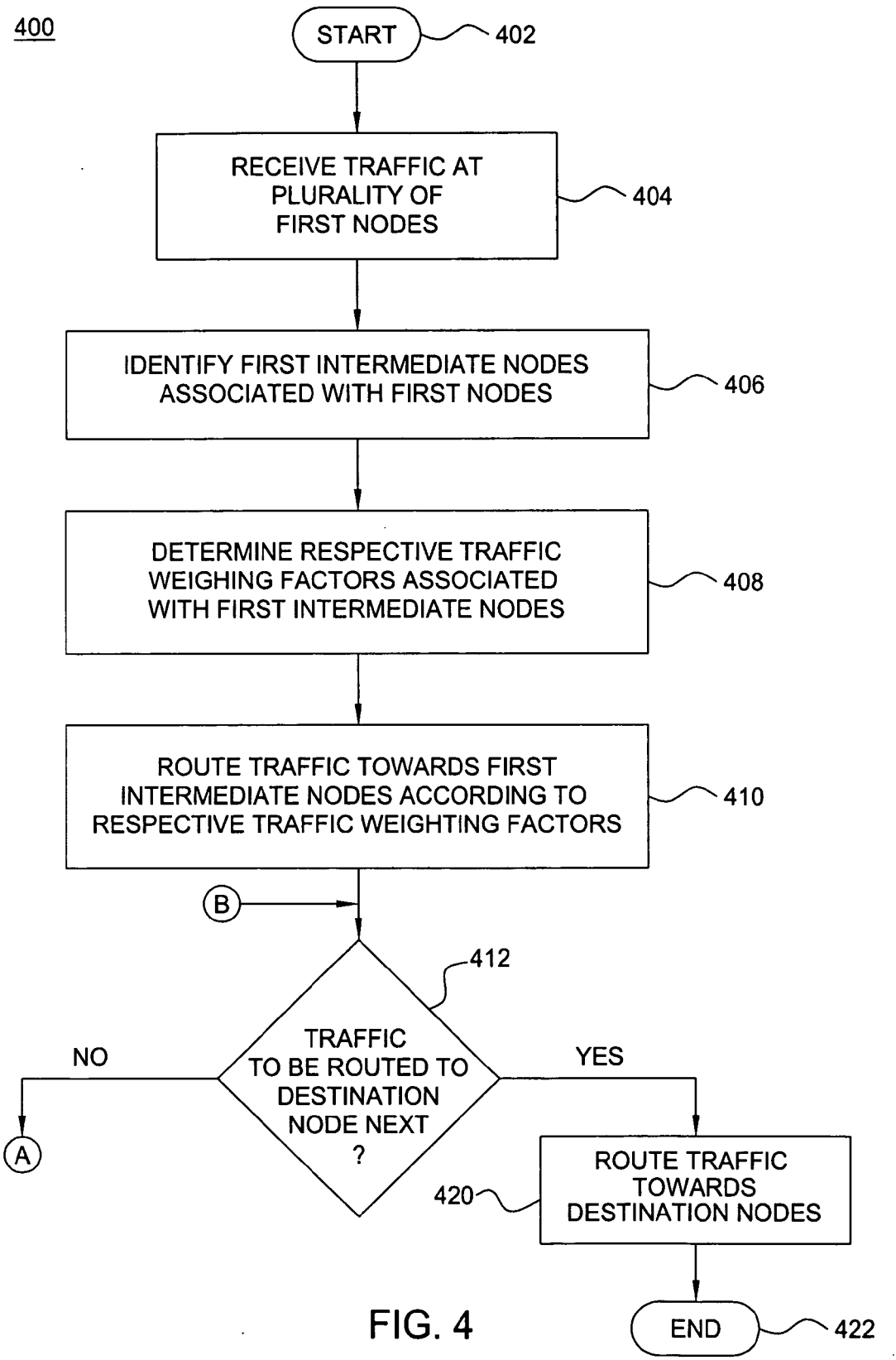
FIG. 4 depicts a flow diagram of a method according to the present invention.
Figure 4A:
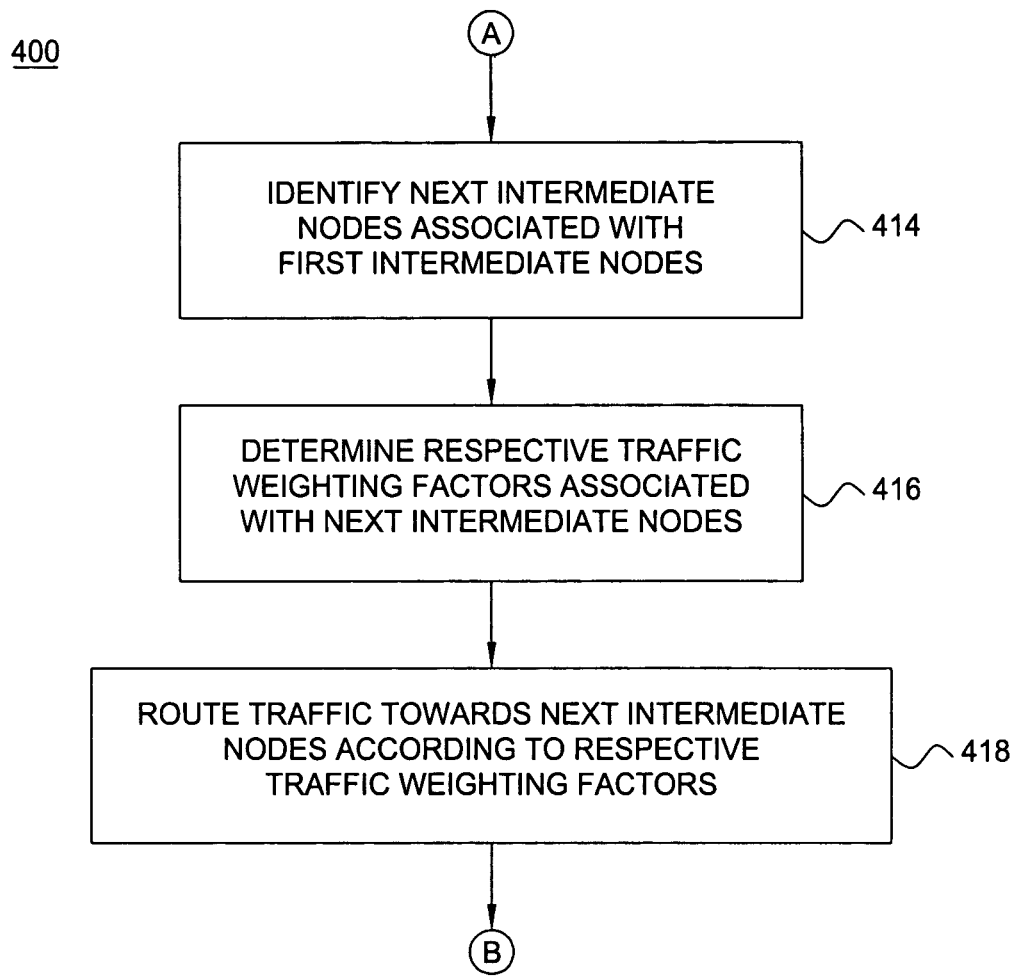

FIG. 4 depicts a flow diagram of a method according to the present invention. Specifically, FIG. 4 depicts a flow diagram of a method 400 for routing network traffic from a plurality of first nodes to a plurality of intermediate nodes according to first respective intermediate node traffic weighting factors; and, optionally, to a plurality of destination nodes. The method 400 of FIG. 4 is entered at step 402 and proceeds to step 404 where traffic is received by a plurality of first nodes. The network traffic is received and processed according to any suitable method of performing those functions as known in the art.

At step 406, each of the plurality of first nodes identifies the intermediate nodes to which the traffic is to be routed. The intermediate nodes to which the traffic (data packets) is to be routed are determined by at least one of a plurality of methods including the use of signaling with management system 120 via communication link 130, at least one table lookup within each of the plurality of first nodes 112, reading respective headers of the data packets and the like.

At step 408, each of the plurality of first nodes determines the respective intermediate node traffic weighting factors associated with each of the plurality of intermediate nodes determined in step 406. For each of the plurality of first nodes, the respective traffic weighting factors associated with each of the corresponding plurality of intermediate nodes have a sum of one (one hundred percent), as described above.

At step 410, the traffic received by the plurality of first nodes at step 404 is routed to the plurality of intermediate nodes according to the respective traffic weighting factors associated with each of the plurality of intermediate nodes. The intermediate nodes to which traffic is routed are not necessarily directly coupled to the plurality of first nodes that are routing the traffic. In one embodiment, the method 400 optionally ends after step 410. In another embodiment, the method 400 proceeds to step 412.

At step 412, each of the plurality of intermediate nodes determines if the network traffic should be routed directly to the plurality of destination nodes, or if the traffic should be routed to a next plurality of intermediate nodes prior to being routed to the plurality of destination nodes. If the network traffic is routed to a next plurality of intermediate nodes, the method 400 proceeds to step 414. If the network traffic is routed directly to the plurality of destination nodes, the method 400 proceeds to step 420.

The steps 414, 416 and 418 as depicted in FIG. 4 correspond to the steps 406, 408 and 410 as depicted in FIG. 4 and described herein, and are performed in substantially the same manner. In place of the first respective traffic weighting factors associated with the first plurality of intermediate nodes, the steps 414, 416 and 418 are performed according to next respective intermediate node traffic weighting factors associated with each of the next plurality of intermediate nodes.

The steps 412, 414, 416 and 418 are then executed recursively until the network traffic is routed to the plurality of intermediate nodes that will route the network traffic directly to at least one of the plurality of destination nodes. As the traffic is received by each of the plurality of intermediate nodes that route the traffic directly to at least one of the plurality of destination nodes, the method 400 proceeds to 420.

At step 420, each of the final plurality of intermediate nodes that receives the traffic routes that traffic towards at least one of the plurality of destination nodes. The destination nodes towards which the traffic is routed are not necessarily directly coupled to each of the plurality of intermediate nodes from which the traffic is routed. In one embodiment, the destination nodes towards which the traffic is routed are determined by the intermediate nodes from which the traffic is routed (by accessing respective headers of each of the data packets). The routing of traffic from the final plurality of intermediate nodes towards the plurality of destination nodes is accomplished by at least one of a plurality of methods.

In one embodiment, routing of traffic from each of the final plurality of intermediate nodes towards at least one of the plurality of destination nodes is performed using a conventional method of routing traffic within a network, such as least cost path routing algorithms, shortest path routing algorithms and the like. In another embodiment, the routing of traffic from the each of the final plurality of intermediate nodes towards at least one of the plurality of destination nodes is performed according to respective traffic weighting factors associated with each of final plurality of intermediate nodes. After the traffic has been routed towards at least one of the plurality of destination nodes, method 400 proceeds to step 422 where method 400 ends.

Figure 5:
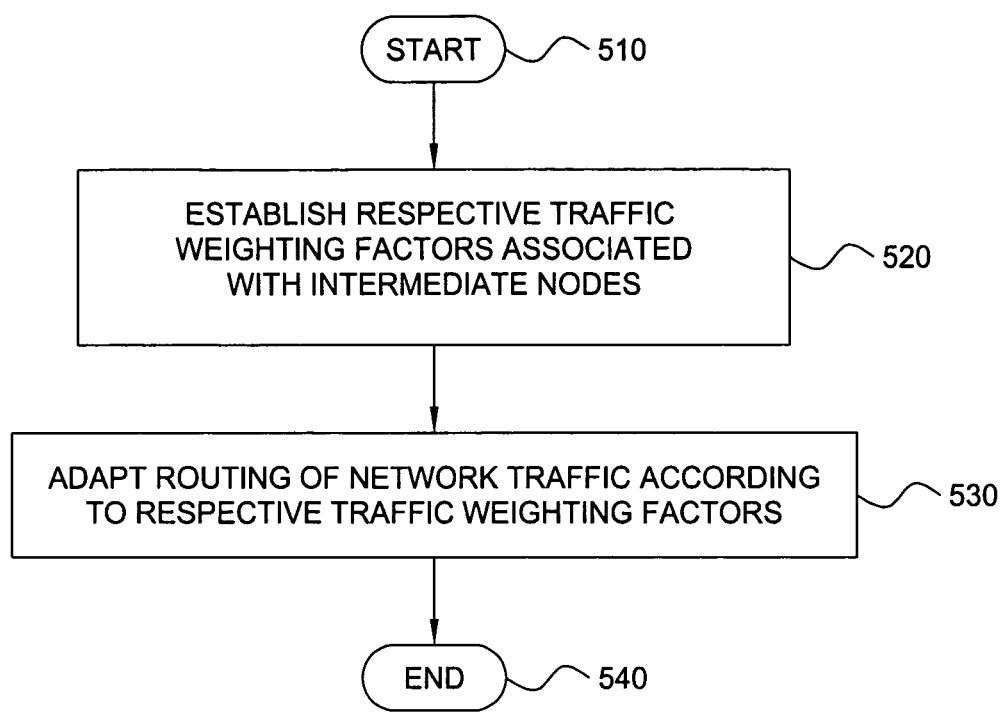
FIG. 5 depicts a flow diagram of a method according to the present invention.

FIG. 5 depicts a flow diagram of a method according to the invention. Specifically, FIG. 5 depicts a flow diagram of a method 500 for adapting traffic flow within an existing network having a plurality of first nodes, a plurality of intermediate nodes and a plurality of destination nodes. The method 500 of FIG. 5 is entered at step 510 and proceeds to step 520.

At step 520, the respective intermediate node traffic weighting factors associated with the plurality of intermediate nodes are established. As described above, the respective traffic weighting factors correspond to the fraction of traffic received at one of the plurality of first nodes that is routed to one of the plurality of intermediate nodes associated with that first node.

In one embodiment, the respective traffic weighting factors are determined by the management system 120 and communicated to communication network 110 via communication link 130. In another embodiment, the respective traffic weighting factors are calculated by at least one of the plurality of first nodes, the plurality of intermediate nodes and the plurality of destination nodes, and communicated amongst the nodes within communication network 110. For each of the plurality of first nodes, the respective intermediate node traffic weighting factors have a sum of one (one hundred percent).

At step 530, following the establishment of the respective intermediate node traffic weighting factors, the routing of traffic within the network is adapted according to the respective traffic weighting factors. The routing of traffic according to the established respective traffic weighting factors is accomplished using any suitable method of routing traffic described herein. The method 500 then proceeds to step 540 where the method 500 ends.

In one embodiment according to method 500 described above, in which at least one other plurality of intermediate nodes is used to route traffic from the plurality of first nodes to the plurality of destination nodes, other respective traffic weighting factors are established such that each of the at least one other plurality of intermediate nodes has associated with it the other respective traffic weighting factors. In this embodiment, the routing of traffic within the network is further adapted according to the other respective traffic weighting factors.

In each of the embodiments described above, the respective intermediate node traffic weighting factors may be computed and established such that a path having a substantially constant utilization is established between two nodes of a communication network. As described above, the total capacity of the path having a substantially constant utilization is given by the equation: $\Theta_j R_i + \Theta_i C_j$. In this equation, the first term $\Theta_j R_i$ represents the amount of network traffic routed from $node_i$ to $node_j$ that is currently in the first phase of routing (illustratively, from one of the first nodes 112 to one of the intermediate nodes 114). Similarly, the second term $\Theta_i C_j$ represents the amount of network traffic routed from $node_i$ to $node_j$ that is currently in the second phase of routing (illustratively, from one of the intermediate nodes 114 to one of destination nodes 116).

In the first term $\Theta_j R_i$, $\Theta_j$ is the intermediate node traffic weighting factor associated with $node_j$, and $R_i$ is the total ingress capacity of $node_i$. In the second term $\Theta_i C_j$, $\Theta_i$ is the intermediate node traffic weighting factor associated with $node_i$, and $C_j$ is the total egress capacity of $node_j$. As described above, the intermediate node traffic weighting factors $\Theta_i$ and $\Theta_j$ represent the fraction of traffic routed to those respective nodes from the first nodes 112. As such, the total amount of traffic between $node_i$ and $node_j$ (and therefore, the total amount of capacity required between $node_i$ and $node_j$) is independent of the traffic matrix of communication network 110.

In one embodiment of the present invention, traffic at the plurality of first nodes is split at the packet level such that the packets belonging to the same connection take different paths from one of the first nodes to one of the plurality of destination nodes. In this embodiment, packets taking different paths may suffer different network latencies, and therefore, may arrive out of sequence at the destination node. In this embodiment, the use of at least one re-ordering buffer at the destination node is required in order to rearrange the packets of a connection in the correct sequence.

In another embodiment of the present invention, traffic at the plurality of first nodes is split at the flow level such that the packets belonging to the same connection traverse the same path from one of the plurality of first nodes to one of the plurality of destination nodes. In this embodiment, per-flow states are maintained at each of the plurality of intermediate nodes. A flow level has associated with it a first node port, a first node address, a destination node port, a destination node address and a protocol. The protocol is any protocol suitable for routing traffic from a first node to a destination node while maintaining the per-flow states.

As discussed herein, in one embodiment, the invention comprises a method for routing traffic toward a destination node via a non-destination node within a communications path adapted to convey traffic towards the destination node. In this embodiment the non-destination node associates a traffic weighting factor to at least one of a plurality of nodes intermediate the non-destination node and the destination node, and the non-destination node routes respective portions of the traffic towards the intermediate nodes according to the respective intermediate node traffic weighting factors.

In the different embodiments described herein, the dependency of the intermediate node traffic weighting factors on the first nodes and the destination nodes may vary. In one embodiment, the intermediate node traffic weighting factors are independent of both the plurality of first nodes and the plurality of destination nodes. In another embodiment, the intermediate node traffic weighting factors are dependent on the plurality of first nodes and independent of the plurality of destination nodes. In another embodiment, the intermediate node traffic weighting factors are dependent on both the plurality of first nodes and the plurality of destination nodes.

In the methods according to the present invention, as described in detail above, knowledge of the actual traffic within a network is not required in order to optimize the routing of the traffic through the network. Rather, only knowledge of ingress and egress capacities associated with each of the nodes in the network are required in order to optimize the routing of traffic through the network.

Although various embodiments which incorporate the teachings of the present invention have been shown and described in detail herein, those skilled in the art can readily devise many other varied embodiments that still incorporate these teachings.

What is claimed is:

1. A method for adapting traffic flow within a network having a first node, a plurality of intermediate nodes, and a destination node, the method comprising:
   receiving traffic at the first node, the first node having associated therewith a plurality of intermediate node traffic weighting factors associated with the respective plurality of intermediate nodes, wherein the traffic is intended for the destination node;
   in a first phase of routing, routing a plurality of portions of the traffic from the first node to the respective intermediate nodes according to the respective traffic weighting factors associated with the respective intermediate nodes, wherein one of the intermediate nodes receiving one of the respective portions of the traffic in the first phase of routing receives the respective portion of the traffic from the first node via at least one other of the intermediate nodes of the plurality of intermediate nodes; and
   in a second phase of routing, routing the respective portions of the traffic received at the respective intermediate nodes in the first phase of routing from the respective intermediate nodes to the destination node, wherein one of the intermediate nodes routing one of the respective portions of the traffic received in the first phase of routing to the destination node in the second phase of routing routes the respective portion of the traffic to the destination node via at least one other of the intermediate nodes of the plurality of intermediate nodes;
   wherein the intermediate node traffic weighting factors are configured to provide a constant utilization of a path from a first one of the intermediate nodes to a second one of the intermediate nodes, wherein the constant utilization of the path has a capacity given by $\Theta_j R_i + \Theta_i C_j$, wherein $\Theta_j R_i$ represents an amount of traffic routed from the first one of the intermediate nodes to the second one of the intermediate nodes via the path in the first phase of routing and $\Theta_i C_j$ represents an amount of traffic routed from the first one of the intermediate nodes to the second one of the intermediate nodes via the path in the second phase of routing, wherein $\Theta_i$ is the intermediate node traffic weighting factor of the first one of the intermediate nodes and $R_i$ is an ingress capacity of the first one of the intermediate nodes, wherein $\Theta_j$ is the intermediate node traffic weighting factor of the second one of the intermediate nodes and $C_j$ is an egress capacity of the second one of the intermediate nodes.

2. The method of claim 1, wherein the traffic weighting factors are adapted by a management system.

3. The method of claim 1, wherein the routing of the traffic in the first phase and the second phase is performed independent of a traffic matrix.

4. The method of claim 1, wherein the intermediate node traffic weighting factors are independent of the first node and the destination node.

5. The method of claim 1, wherein the intermediate node traffic weighting factors are dependent on the first node and independent of the destination node.

6. The method of claim 1, wherein the intermediate node traffic weighting factors are dependent on the first node and the destination node.

7. The method of claim 1, wherein the traffic comprises packets from a single connection.

8. The method of claim 1, wherein the traffic comprises packets from multiple connections.

9. A non-transitory computer-readable storage medium storing instructions which, when executed by one or more computers, cause the one or more computers to perform a method for adapting traffic flow within a network having a first node, a plurality of intermediate nodes, and a destination node, the method comprising:
   receiving traffic at the first node, the first node having associated therewith a plurality of intermediate node traffic weighting factors associated with the respective plurality of intermediate nodes, wherein the traffic is intended for the destination node;
   in a first phase of routing, routing a plurality of portions of the traffic from the first node to the respective intermediate nodes according to the respective traffic weighting factors associated with the respective intermediate nodes, wherein one of the intermediate nodes receiving one of the respective portions of the traffic in the first phase of routing receives the respective portion of the traffic from the first node via at least one other of the intermediate nodes of the plurality of intermediate nodes; and
   in a second phase of routing, routing the respective portions of the traffic received at the respective intermediate nodes in the first phase of routing from the respective intermediate nodes to the destination node, wherein one of the intermediate nodes routing one of the respective portions of the traffic received in the first phase of routing to the destination node in the second phase of routing routes the respective portion of the traffic to the destination node via at least one other of the intermediate nodes of the plurality of intermediate nodes;

wherein the intermediate node traffic weighting factors are configured to provide a constant utilization of a path from a first one of the intermediate nodes to a second one of the intermediate nodes, wherein the constant utilization of the path has a capacity given by $\Theta_j R_i + \Theta_i C_j$, wherein $\Theta_j R_i$ represents an amount of traffic routed from the first one of the intermediate nodes to the second one of the intermediate nodes via the path in the first phase of routing and $\Theta_i C_j$ represents an amount of traffic routed from the first one of the intermediate nodes to the second one of the intermediate nodes via the path in the second phase of routing, wherein $\Theta_i$ is the intermediate node traffic weighting factor of the first one of the intermediate nodes and $R_i$ is an ingress capacity of the first one of the intermediate nodes, wherein $\Theta_j$ is the intermediate node traffic weighting factor of the second one of the intermediate nodes and $C_j$ is an egress capacity of the second one of the intermediate nodes.

10. The non-transitory computer-readable storage medium of claim 9, wherein the traffic weighting factors are adapted by a management system.

11. The non-transitory computer-readable storage medium of claim 9, wherein the routing of the traffic in the first phase and the second phase is performed independent of a traffic matrix.

12. The non-transitory computer-readable storage medium of claim 9, wherein the intermediate node traffic weighting factors are independent of the first node and the destination node.

13. The non-transitory computer-readable storage medium of claim 9, wherein the intermediate node traffic weighting factors are dependent on the first node and independent of the destination node.

14. The non-transitory computer-readable storage medium of claim 9, wherein the intermediate node traffic weighting factors are dependent on the first node and the destination node.

15. The non-transitory computer-readable storage medium of claim 9, wherein the traffic comprises packets from a single connection.

16. The non-transitory computer-readable storage medium of claim 9, wherein the traffic comprises packets from multiple connections.

17. A system configured for adapting traffic flow, the system comprising:

a network including a first node, a plurality of intermediate nodes, and a destination node;

wherein the first node is configured to receive traffic intended for the destination node, wherein the first node has associated therewith a plurality of intermediate node traffic weighting factors associated with the respective plurality of intermediate nodes;

wherein the first node is configured to, in a first phase of routing, route a plurality of portions of the traffic from the first node to the respective intermediate nodes according to the respective traffic weighting factors associated with the respective intermediate nodes, wherein one of the intermediate nodes receiving one of the respective portions of the traffic in the first phase of routing receives the respective portion of the traffic from the first node via at least one other of the intermediate nodes of the plurality of intermediate nodes; and wherein the intermediate nodes are configured to, in a second phase of routing, route the respective portions of the traffic received at the respective intermediate nodes in the first phase of routing from the respective intermediate nodes to the destination node, wherein one of the intermediate nodes routing one of the respective portions of the traffic received in the first phase of routing to the destination node in the second phase of routing routes the respective portion of the traffic to the destination node via at least one other of the intermediate nodes of the plurality of intermediate nodes;

wherein the intermediate node traffic weighting factors are configured to provide a constant utilization of a path from a first one of the intermediate nodes to a second one of the intermediate nodes, wherein the constant utilization of the path has a capacity given by $\Theta_j R_i + \Theta_i C_j$, wherein $\Theta_j R_i$ represents an amount of traffic routed from the first one of the intermediate nodes to the second one of the intermediate nodes via the path in the first phase of routing and $\Theta_i C_j$ represents an amount of traffic routed from the first one of the intermediate nodes to the second one of the intermediate nodes via the path in the second phase of routing, wherein $\Theta_i$ is the intermediate node traffic weighting factor of the first one of the intermediate nodes and $R_i$ is an ingress capacity of the first one of the intermediate nodes, wherein $\Theta_j$ is the intermediate node traffic weighting factor of the second one of the intermediate nodes and $C_j$ is an egress capacity of the second one of the intermediate nodes.

\* \* \* \* \*